United States Patent [19]
Hitzman

[11] 3,844,893
[45] Oct. 29, 1974

[54] MICROBIAL SYNTHESIS
[75] Inventor: Donald O. Hitzman, Bartlesville, Okla.
[73] Assignee: Phillips Petroleum Company, Bartlesville, Okla.
[22] Filed: Feb. 12, 1973
[21] Appl. No.: 332,031

[52] U.S. Cl................. 195/115, 195/28 R, 195/81, 195/93, 195/96, 195/49
[51] Int. Cl.........................................C12b 1/00
[58] Field of Search.........195/28 R, 1, 115, 93, 96, 195/81, 49

[56] References Cited
UNITED STATES PATENTS

| | | | |
|---|---|---|---|
| 3,384,491 | 5/1968 | Guenther et al.................. | 195/28 R |
| 3,427,223 | 2/1969 | Frankenfeld.......................... | 195/96 |
| 3,530,039 | 9/1970 | Bernheimer et al..................... | 195/1 |
| 3,622,465 | 11/1971 | Orgel et al........................ | 195/28 R |
| 3,642,577 | 2/1972 | Gorring............................. | 195/28 R |
| 3,644,175 | 2/1972 | Dasinger et al...................... | 195/96 |
| 3,655,511 | 4/1972 | Bonavita............................ | 195/28 R |
| 3,755,082 | 8/1973 | Terui..................................... | 195/49 |

*Primary Examiner*—Alvin E. Tanenholtz

[57] ABSTRACT

In the separation of microorganisms from fermentor growth media, a separating agent such as an alcohol, is added to the fermentor effluent to facilitate separation of the cellular material. A portion of the spent media and separating agent is recycled to the fermentor as carbon energy source therein. Further alcohol separating agent is separated from the balance of the spent media and reused for separation purposes or for use in the fermentor.

15 Claims, 1 Drawing Figure

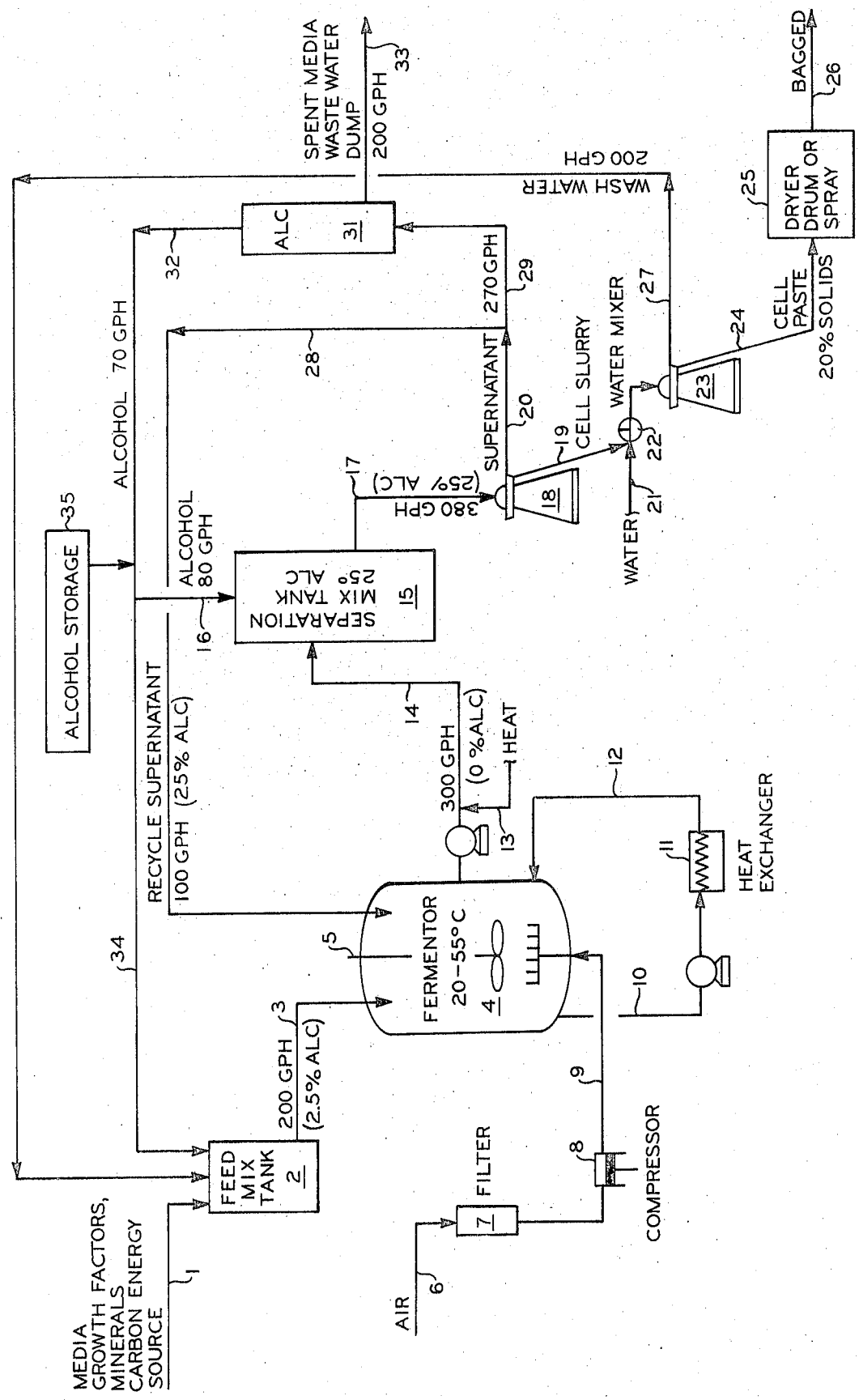

MICROBIAL SYNTHESIS

FIELD OF THE INVENTION

The invention relates to an improved process for microbial hydrocarbon fermentation and separation of microorganisms therefrom.

BACKGROUND OF THE INVENTION

Various biosynthetic processes have been and are being developed for producing proteinaceous products suitable for human and animal consumption. One of the most logical carbon sources for such productions has been various hydrocarbon fractions derived from crude oils or from coal. Improvements have been made whereby water-soluble oxygenated hydrocarbons, by such processes as the Fischer-Tropsch synthesis, Topsoe, ICI, or other chemical synthesis processes, have been utilized to provide the carbon energy source for microbial hydrocarbon fermentation so as to produce microorganisms which may be utilized as such, or subsequently treated by known means for separation of protein, amino acids, gums, and other desired and valuable fermentation products.

Separating agents such as lower alcohols have been used for precipitation or flotation of microorganisms from the fermentor growth media after the degree or extent of growth desired has been achieved. The use of such separating agents has been kept to a minimum to minimize costs, since the high dilution resulting from admixture with the spent media has resulted in loss and wastage of the separating agent. Thus, the barest minimum of such as alcohol heretofore has been used to assist separation. Further, in separation, all of the microorganisms recovered leave the spent media behind, containing valuable salts necessary for growth, and this spent media has been a waste material.

OBJECTS OF THE INVENTION

It is an object of the invention to provide an improved process for microbial synthesis.

Other aspects, objects, and the several advantages of my invention will be apparent to one skilled in the art from the following disclosure and my appended claims.

DESCRIPTION OF THE INVENTION

My invention permits large-scale biosynthetic protein production to be accomplished economically. According to my invention, a separating agent is added to the fermentor effluent to facilitate separation of the microorganisms from the spent media, and a portion of the separated spent media including separating agent is in part recycled without further separation to the fermentor, thus reemploying valuable salts and further employing the separating agent in the fermentor as at least a portion of the carbon energy source necessary for microorganism production. The rest of the spent media containing separating agent is sent to recovery means to recover the separating agent for recycle to the fermentation step or back to the microorganism separation step. In effect, the separating agent thus is utilized both in microorganism separation and as at least a portion of the carbon source feedstock to the process.

The precipitants that I employ include any oxygenated hydrocarbon including alcohols, aldehydes, ketones, acids, phenols, naphthols, and the like. Presently I prefer, as economical and more readily available, alcohols and ketones of up to four carbon atoms per molecule, more preferably the alcohols.

A high degree of separation and recovery cells is obtained in my process. Recycling of the separating agent for use as feedstock and/or reuse as separating agent provides versatility in operation of my process. Recycling of a portion of the spent media containing the separating agent clearly is an important step toward commercial economy. Separation of the balance of the separating agent from remainder of the spent media provides both a feedstock and may provide a useful sterilizing agent for the separation step. The separating agent in the recycled medium can provide a large proportion of the carbon energy source for the fermentation step itself, and also can provide a sterilizing media to the fermentation salts and growth elements. Previously, all feed to the fermentor step has had to be sterilized by heat in a conventional heat sterilization procedure. Use of the recycle media and/or recycle separating agent provides sterilization of such fresh carbon energy source material and/or nutrients as may be necessary.

In my invention, microbial cells may be produced from growth on carbon energy sources such as hydrocarbons, carbohydrates, or oxygenated hydrocarbon compounds, utilizing efficiently almost any hydrocarbon or carbonaceous raw material such as natural gas, petroleum, naphtha, coal, peat, asphalt and the like. Oxygenated hydrocarbons may be employed, such as those obtained by direct oxidation of one of the most abundant hydrocarbon sources available, methane or natural gas, to the oxidized hydrocarbon derivatives thereof including alcohols, aldehydes, ketones, and the like. Utilization of "pure" feedstocks often is undesirable cost-wise, of course.

Oxygenated feedstocks that may be employed include the water-soluble aliphatic alcohols, ketones, aldehydes, carboxylic acids, ethers, polyols, carbohydrates, or any other known carbon source upon which microorganisms may be cultured and grown, using such feedstocks either individually, or in admixture, or otherwise as is known in the art. Further illustrative examples include methanol, ethanol, propanol, butanol, isopropanol, pentanol, hexanol, 1,7-heptandiol, 2-heptanol, 2-methyl-4-pentanol, pentanoic acid, 2-methylbutanoic acid, 2-pentanol, 2-methyl-4-butanol, 2-methyl-3-butanol, 2-butanol, 2-methyl-1-propanol, 2-methyl-2-propanol, 2-propanol, formic acid, propanoic acid, formaldehyde, acetaldehyde, propanal, butanal, 2-methylpropanal, butanoic acid, 2-methylpropanoic acid, pentanoic acid, glutaric acid, hexanoic acid, 2-methylpentanoic acid, heptandioic acid, heptanoic acid, 4-heptanone, 2-heptanone, octanoic acid, 2-ethylhexanoic acid, glycerine, ethylene glycol, propylene glycol, 2-propanone, 2-butanone, acetone, diethyl ether, methyl ethyl ether, dimethyl ether, di-n-propyl ether, n-propyl isopropyl ether, and the like.

Where the carbon feed source contains undesirable quantities of aldehydes and the like, the microbial feed to the fermentor preferably is priorly contacted with a nitrogen-containing compound reactive with aldehydes. Examples of such nitrogen-containing compounds include ammonia, ammonium hydroxide, ammonium sulfate, ammonium nitrate, ammonium phosphate, acetonitrile, urea, guanidine, uric acid, and the like. Ammonia or ammonium compounds presently are preferred. Sufficient amounts of the nitrogen-containing compound should be added to render innocuous the deleterious material in the feedstock. Normally, from about 0.01 to 10 mole equivalents of said nitrogen-containing compound should be provided for each mole of aldehyde. It usually is preferred that only the water-soluble products of the resultant mixture be fed to the fermentor.

Carbon dioxide produced by microbial metabolism in the fermentation process can be incorporated into the whole process by recycling and converting it for use in a Fischer-Tropsch synthesis, or other chemical synthesis processes known to the art.

The fermentation process is carried out according to the conditions generally known in the art to support microbial fermentation. Generally, temperatures of about 15° to 60° C., preferably 20° to 55° C., and pressures of about 0.1 to 100 atmospheres are employed, though normally pressures in the range of about 1 to 30 atmospheres are suitable. One method to assist suitable rates of cell production is to maintain an adequate dissolved oxygen level in the fermentor, such as by running the fermentor under increased air pressures or by use of air enriched with pure oxygen. Higher temperatures when maintained coincident with higher pressures permit the microorganisms to withstand the higher temperatures, reducing cooling expense. Increased fermentor pressures often are useful to aid in the recovery of metabolic products. By suddenly releasing the pressure of the fermentor, cells can be ruptured, thus releasing cellular components, consequently, assisting in ultimate separation of various cellular components.

The particular microorganism employed in my process does not appear critical. Exemplary of suitable microorganisms are *Pseudomonas methanica* NRRL B-3449, *Pseudomonas fluorescens* NRRL B-3452, *Methanomonas methanica* NRRL B-3450, *Methanomonas methanooxidans* NRRL B-3451, *Arthobacter parafficum* NRRL B-3453, and *Corynebacterium simplex* NRRL B-3454. The *Pseudomonas* species are particularly useful microorganisms. Bacillus, Mycobacterium, Actinomyces, and Nocardia genuses are other illustrative examples of suitable microorganisms. Other examples of bacteria include the genuses: Micrococcus; Rhodobacillus; Arthobacter; Pseudomonas; Chromatium; Nitrosomonas; Serratia; Nitrobacter; Rhizobium; Azotobacter; Aerobacter; Methanomonas; Escherichia, Streptococcus; Nocardia; and Corynebacterium. Other suitable classes of microorganisms include the yeasts such as Torulopsis, Torula, Candida, Hansenula, Pichia, etc., and molds and fungi such as Penicillium, Aspergillus, Gibberella, Fusarium, etc, and the like. Admixtures of microorganisms can also be employed.

Sufficient water is utilized in the fermentation procedure to provide for the particular requirements of the microorganisms employed. Suitable minerals, growth factors, vitamins, and the like are added in amounts sufficient to provide for the particular needs of the microorganisms utilized. Mineral and growth factors, and the like, so employed, vary according to the requirements of the particular microorganisms and are known to those skilled in the art or are readily determined by those so skilled. Nitrogen compounds can be added to the fermentor, such as urea, or ammonia, if desired. The ammonium ions or nitrogen-containing compound where charged to aldehyde-containing oxidized hydrocarbon feedstocks normally are a sufficient source of nitrogen.

Upon completion of the desired degree of fermentation, the microbial fermentation products are efficiently separated by the technique of this invention.

SEPARATION

The addition of oxygenated hydrocarbon separation agents as I have described, more particularly polar organic solvents of the lower alcohol and lower ketone type, preferably of one to four carbon atoms per molecule, such as methanol, ethanol, the propanols, the butanols, acetone, methylethylketone, diethylketone, methylpropylketone, alone or in admixture, after the fermentation has been completed is effective in separating the cells, polymeric gums, and other production products from the fermentation media. Depending on the type of separating agent employed the cellular material tends to precipitate with the lower molecular weight separating agents, or may tend to float with the higher molecular weight agents. The cellular mass is removable by separation means leaving a relatively clear spent media from which the separating agent is recoverable and can be reused.

ILLUSTRATIVE FIGURE

Exemplary of my disclosure and not intended as a limitation on the scope of the materials employed therein, but only to assist in the understanding of the process of my invention, I have attached a FIGURE. While the description of the process therein embodied is couched in terms of an example showing particular amounts of materials, these amounts should be considered as illustrative, and not as limitative, since, as is known, variations in fermentation process conditions may be employed in a variety of aspects.

The attached FIGURE illustrates the feed of microorganism, minerals, growth factors, a carbon energy source and oxygen in the form of air to a fermentor. The fermentor effluent after the proper degree or extent of microorganism fermentation is achieved is discharged, preferably on a continuous basis, preferably heated, to be admixed with an effective separating amount of or proportion of a separating agent, preferably a polar organic compound of a lower alcohol or ketone, more preferably methanol, and then is separated. The cellular material then is recovered. Spent media containing separating agent is in part recycled to the fermentor to obtain economical use of the separating agent precipitant as a part of the carbon energy source together with attendant reuse at least in part of the spent media which still contains valuable minerals and other salts necessary for the fermentation process. The remainder of the spent media including separating agent is taken to separation means, such as fractionation, to recover the separating agent for recycle either to the separation step or to the fermentation step or both. Residual spent media substantially free of separating agent and cellular product then is wasted. The separated cellular material may be treated in various aspects for recovery, with optional stripping of minor amounts of separating agent if desired.

The attached FIGURE is described in more detail. I again point out that particular values employed are designed to illustrate my invention and not limit my invention, but only to assist in providing clarity. Thus, the description is couched in terms of a specific example.

Media, growth factors, mineral salts, and the like, water as necessary, carbon energy source, are fed 1 to mixing feed tank 2 and fed as necessary 3 to fermentor 4. Fermentor 4 receives an innoculum of one or more suitable strains of microorganisms. Of course, any or all of such components may, if desired, be fed directly individually, or in various subcombinations to fermentor 4. In my process, the carbon energy source will comprise at least in part the separating agent derived from employment of the described separating agent in the separation step hereinafter described. In my example, I employ methanol both as carbon energy source and as separating agent.

Typically, my process takes from feed mix tank 2 a feed mixture 3 containing about 2.5 volume percent methanol alcohol as carbon energy source at the rate of about 200 gallons per hour of feed mixture on a continuous basis to fermentor 4. Fermentor 4 is maintained at a temperature of about 20° to 55° C., includes stirrer means 5, and for means to supply oxygen such as in the form of air 6 preferably filtered 7 bubbling into the fermentor 4 by means of compressor 8 and feed line 9.

Temperature in fermentor 4 is controlled by cooling means such as by recirculation 10 of a portion of the fermentor contents through cooling heat exchanger 11 and back 12 to fermentor 4. After allowing for a suitable average residence time in the fermentor, which on the average will be about 2 to 12 hours, a continuous stream 14 is withdrawn from the fermentor at the rate of about 300 gallons per hour. Fermentor effluent 14 would be expected to contain essentially zero methanol, though a trace may be maintained if desired in the fermentor effluent as a control measure of the rate of carbon energy source consumption, such as about 0.01 to 0.1 volume per cent. Preferably heat 13 is applied to fermentor effluent 14 to raise the temperature thereof to such as about 100° C., preferably 65° to 100° C., to assist in separating cellular material. The separation may be and usually is aided by addition of small amount of an acid or base (not shown) to effect separation at the isoelectric point of the cells. This can be at pH values from pH 2 to 11, though with most cells it is about 4 to 5.

In separation mix tank 15 the fermentor effluent 14 is admixed with separating agent methanol from supply 16 at the rate of about 80 gallons per hour so as to precipitate the cellular material. This rate of methanol 16 feed maintains an average of approximately 25 volume percent alcohol in separation mix tank 15. Effluent 17 from separation mix tank 15 is drawn off at the rate of about 380 gallons per hour to separation means 18 such as a settler or filter or skimming means, though more preferably a centrifuge. The cellular slurry is separated and taken off 19, and the supernatant liquid material 20 is taken to other recovery. The supernatant liquid material 20 is separated spent media and contains separating agent methanol, growth factors, mineral salts, water, and the like.

The cellular slurry 19 preferably is admixed with water 21 in wash water mixer 22 and taken to secondary separator means 23 such as a centrifuge or filter. The cellular paste 24 separated in the secondary separator means 23 contains at this stage about 20 percent solids and is taken to dewatering means such as dryer 25, and then may be bagged 26 or otherwise further treated by other separation means into proteinaceous and other components.

In the initial separation 18 of separation mix tank effluent 17 into cellular slurry 19 and supernatant spent media and precipitant alcohol 20, the supernatant liquid 20 comprises about 370 gallons per hour containing not only a valuable percentage of separating agent alcohol, but also contains potentially useful mineral salts. This valuable stream 20 is recycled in part 28 to fermentor 4 at the rate of approximately 100 gallons per hour containing up to 25 percent alcohol. The remainder 29 of stream 20 at the rate of about 270 gallons per hour is taken to alcohol recovery means 31, such as a fractionator, and the alcohol content thereof thus substantially recovered 32 while the separated spent media including waste water is sent 33 at the rate of about 200 gallons per hour to waste disposal. It is of particular advantage in my process that recovered alcohol 32 need only be of sufficient that it can be used again as a separating agent 16, and need not be of high purity; thus, precise fractionation 31 is unnecessary, and several per cent water in overhead 32 may readily be tolerated.

The alcohol 32 so recovered may be directed 34 to the feed mix tank 2 for preparation of fresh feed 3 to fermentor 5, or may be directed to the precipitant alcohol 16 line to the separation mix tank 15, or may be stored 35 until needed. Supplemental separating agent-precipitant alcohol 35 may be added to the system as required, such as to mix with recovered alcohol 32 as shown, or to precipitant line 16, or to feed 34 to feed mix tank 2, or preferably direct to separation mix step 15.

The proportion of separating agent, here in my example a precipitant methanol 16 added to fermentor effluent 14 to provide suitable separation in separator means 15 according to this example, can vary widely relative to the fermentor effluent 14 up to as much as double or greater such volume. Even larger volumes of separating agent precipitant alcohol of course may be utilized, but are unnecessary and simply mean greater amounts to separate and recycle, though in the process of my invention, such are readily and easily handled by separation and fractionation means. As a broad range of separating agent, between about 1 percent to 100 volume percent may be added, depending on extent of separation desired, the agent itself, and the like. The higher amounts, however, actually prove useful to achieve separation of the cellular material, and to sterilize same. The designated higher amounts obtained in separator means 18 represent a means of providing a sterile cellular slurry 19, as well as providing a greater percentage of separating agent in the separator effluent 20, which in effect are quantities which will sterilize same, and thus prove desirable in the recycle supernatant 28. A presently preferred range of separating agent is about 5 volume percent to 50 volume percent.

In the wash water 27 from secondary separator means 23, the concentration of precipitant alcohol generally will be relatively low, such as less than about 0.5 percent, more usually about 0.1 to 0.2 percent. However, since all or part of this wash water 27 may be recycled to the feed mix tank 2, the precipitant concentration may be allowed to go higher without creating problems in my process, since this recycle is an effective recovery means to avoid wastage of the precipitant. This wash water 27 is potentially valuable since some water is useful in preparation of culture media in the feed mix 2, and such low concentration of alcohol as is contained in wash water 27 represents potentially valuable carbon energy source material. Therefore, where such recovery is desired, this wash water 27 is returned to feed mix tank 2 at the rate of approximately 200 gallons per hour.

If desired, any traces of precipitant alcohol left on the cellular paste 24 to dewatering means 25 may be recovered by such as condensation means or other recovery means (not shown) and recycled back if desired to alcohol storage 35 or to feed mix tank 2. It would be feasible in this example to conduct the vapors from dryer 25 by means (not shown) to alcohol separation and in effect to allow the fractionator to absorb the traces of alcohol vapor.

In my FIGURE I have indicated that heat 13 may be and preferably is applied to fermentor effluent 14. The heat may by means 13 as shown, or optionally may be by means of supplying suitably preheated separating agent 16. The addition of heat facilitates separation of the microorganisms and aids in achieving maximum cellular recovery from the fermentor effluent.

As an example of recovery, the cellular effluent from a typical run using *Arthobacter parafficium* NNRL B-3453 grown on methanol as carbon energy was treated in 25 cc increments at various temperatures and pH values employing methanol as separating-precipitating agent. Surprisingly, the best cell recovery occurred at the pH of the growth medium, which in this case was a pH of about 6.8, and at growth temperature, as the following table will illustrate:

cess was continuous with a feed rate of 300 ml/hr. $NH_4OH$ solution (8.5% $NH_3$) was fed on pH demand and as the nitrogen source. The cell concentration in the fermentor effluent was 21g/l (dry cell weight) with virtually nil alcohol content. The fermentor effluent from this continuous fermentation was treated with various concentrations of the same methanol as was used as the carbon feed to the fermentor and tested in a DeLaval Gyrotester to determine the effectiveness of the alcohol addition on centrifugation. Half of the fermentor effluent was treated with alcohol and the other half was heated to 65° C. to kill the cells and aid recovery with the alcohol. The following table will show the effectiveness of this treatment.

TABLE II

| 10 cc Cell effluent treatment with | | % Cells Recovered By Gyrotester After A 30 sec. Centrifugation |
|---|---|---|
| 1. | NONE | 88 % |
| 2. | 1cc methanol | 95 % |
| 3. | 2.5 cc methanol | 96 % |
| 4. | 5 cc methanol | 98 % |
| 5. | 10 cc methanol | 99 % |
| 10 cc Cell Effluent heat to 65° and treated with | | |
| 6. | NONE | 93 % |
| 7. | 1 cc methanol | 98 % |
| 8. | 2.5 cc methanol | 98.5 % |
| 9. | 5 cc methanol | 99.97 % |
| 10. | 10 cc methanol | 99.95 % |
| Cells treated with alcohol followed by heat to 65° | | |
| 11. | 5 cc methanol | 99.8 % |
| 12. | 10 cc methanol | 99.91 % |

TABLE I

| Temp. to Which Sample Heated Before Methanol Added | Appearance of 22 cc Sample After Treatment with 25 cc Methanol | 30 sec. Centrifugation on DeLavel Gyro Centrifuge | | |
|---|---|---|---|---|
| | | Appearance of Supernatant | V/V % ppt. | Cell Pack |
| 27° C. | turbid | (b) | 18 | firm |
| 40° C. | do. | (a) | 19 | tight |
| 45° C. | do. | (a) | 18.5 | do. |
| 50° C. | do. | (b) | 18.5 | firm |
| 55° C. | do. | (c) | 11 | loose |
| 60° C. | do. | (c) | 10 | do. |
| 65° C. | flocculated | (d) | 10 | do. |
| 70° C. | do. | (d) | 11 | firm |
| 75° C. | do. | (d) | 12 | firm |

(a) = very slightly turbid
(b-c-d) = increasing turbid

As can be seen the cells grown at 40° C. were best treated at 40–50° C. with an equal volume of methanol to give the best centrifugation.

To further illustrate my invention concerning cell recovery with methanol precipitant followed by reutilization of the precipitant as a carbon energy and/or precipitating agent, a further run was made.

A culture of bacteria *Pseudomonas methanica* NRRL B-3449 was grown in a 14 liter fermenter in 6 liter of medium consisting of:

| Component | gram/liter | |
|---|---|---|
| $H_3PO_4$(85%) | 2. | ml |
| KCl | 1.0 | |
| $MgSO_4.7H_2O$ | 1.5 | |
| $CaCl_2.2H_2O$ | 0.2 | |
| NaCl | 0.1 | |
| Trace mineral solution | 5 | ml | with 8 volume percent methanol as carbon energy source at a pH of 6.6 at 39° C. The fermentation pro- It is within the scope of my invention to vary the organism and fermentation environment to achieve maximum optimum yields of microorganisms, and to vary the type of microorganism production depending on desired production of protein, vitamins, amino acids, gums, and the like. Certainly, other modifications of this invention can be accomplished as will be evident to those skilled in the art in view of the foregoing discussion and examples and appended claims.

I claim:
1. In a fermentation process wherein an oxygenated hydrocarbon as carbon energy source material, nutrients, mineral salts, water, and at least one microorganism capable of employing said oxygenated hydrocarbon carbon energy source material, are maintained under fermentation growth conditions in the fermentation step, and the resulting fermentation process effluent therefrom subsequently is separated into streams comprising cellular material and spent media, the improvement comprising the steps of treating said fermentation process effluent with a separating agent selected from the group consisting of lower alcohols, and ketones in the proportion of at least about 10 volume percent relative to said fermentation process effluent, separating the resulting admixture of fermentation process effluent and separating agent from said treating into a cellular slurry stream and a stream containing spent media and separating agent, recycling at least a portion of said stream of spent media and separating agent to said fermentation step to provide therein at least a part of said carbon energy source material and said mineral salts, separating a further portion of said stream of spent media and separating agent to recover therefrom a portion of said separating agent, and recycling said recovered separating agent to at least one of said fermentation step and said treating step.

2. The process according to claim 1 further including the washing of said cellular slurry stream with water, thereby substantially removing remaining traces of separating agent, dewatering said washed cellular slurry, and recycling said wash water containing removed separating agent to said fermentation step.

3. The process according to claim 1 wherein said fermentation step is operated under aerobic conditions at a temperature in the range of about 15° to 60°C., under a pressure of about 0.1 to 100 atmospheres.

4. The process according to claim 3 wherein said temperature in said fermentation step is in the range of about 20°–55° C., under a pressure of about 1 to 30 atmospheres.

5. The process according to claim 1 wherein said microorganism is a Bacillus, Mycobacterium, actinomyces, Nocardia, Micrococcus, Rhodobacillus, Chromatium, Nitrosomonas, Serratia, Nitrobacter, Rhizobium, Azotobacter, Aerobacter, Escherichia, Streptococcus, Pseudomonas, Methanomonas, Corynebacterium, Arthobacter, Torulopsis, Torula, Candida, Hansenula, Pichia, Penicillium, Aspergillus, Gibberella, or Fusarium.

6. The process according to claim 5 wherein said microorganism is *Pseudomonas methanica* NRRL B–3449, *Pseudomonas fluorescens* NRRL B–3452, *Methanomonas methanica* NRRL B–3450, *Methanomonas methanooxidans* NRRL B–3451, *Arthobacter parafficum* NRRL B–3453, or *Corynebacterium simplex* NRRL B–3454.

7. The process according to claim 6 wherein said microorganism is a Pseudomonas or Arthobacter species.

8. The process according to claim 1 wherein said separating agent is methanol, ethanol, a propanol, a butanol, acetone, methylethyl ketone, diethyl ketone, methylpropyl ketone, or admixture of two or more.

9. The process according to claim 8 wherein said separating agent is said lower alcohol.

10. The process according to claim 9 wherein said separating agent is added in a proportion of up to about 200 percent relative to said fermentation step effluent.

11. The process according to claim 10 wherein said separating agent is substantially methanol, and said separating agent is added in a proportion of between about 10 to 100 volume percent relative to said fermentor effluent.

12. The process according to claim 1 wherein said fermentation step is maintained at a pH dependent on the isoelectric point of cells.

13. The process according to claim 1 wherein said oxygenated hydrocarbon feedstock contains aldehydes, said oxygenated hydrocarbon feedstock containing aldehydes is pretreated with a nitrogen-containing compound prior to employment of said feedstock in said fermentor.

14. The process according to claim 1 further including heating said fermentor effluent to about 65° to 100° C prior to admixing with said precipitant.

15. The process according to claim 7 wherein said carbon energy source comprises methanol, said separating agent comprises methanol, said separating agent is added to said fermentor in an amount sufficient to represent about 25 volume per cent in the resulting admixture, and said fermentor effluent was treated with said separation agent at about 40° to 50° C.

* * * * *